United States Patent

Rowan et al.

[11] Patent Number: 5,886,489
[45] Date of Patent: Mar. 23, 1999

[54] APPARATUS AND METHOD FOR REDUCING SPINDLE POWER AND ACOUSTIC NOISE IN A DISK DRIVE

[75] Inventors: Bryan Scott Rowan; Mantle Man-Hon Yu, both of San Jose, Calif.

[73] Assignee: International Business Machines Corporation, Armonk, N.Y.

[21] Appl. No.: 760,624

[22] Filed: Dec. 4, 1996

[51] Int. Cl.⁶ ............................... H02P 7/28; H02P 6/02
[52] U.S. Cl. ........................ 318/439; 318/138; 318/254
[58] Field of Search .................................. 318/138, 245, 318/254, 439, 560–561; 360/70–78; 388/811, 812

[56] References Cited

U.S. PATENT DOCUMENTS

| | | | |
|---|---|---|---|
| 4,197,489 | 4/1980 | Dunn et al. | 318/138 |
| 4,525,657 | 6/1985 | Nakase et al. | 318/254 |
| 4,651,067 | 3/1987 | Ito et al. | 318/254 |
| 4,874,993 | 10/1989 | Tanaka et al. | 318/254 |
| 4,879,498 | 11/1989 | Shinohara et al. | 318/254 |
| 4,943,760 | 7/1990 | Byrne et al. | 318/701 |
| 5,023,924 | 6/1991 | Tajima et al. | 388/811 |
| 5,115,174 | 5/1992 | Masuda et al. | 318/254 |
| 5,122,719 | 6/1992 | Bessenyei et al. | 318/629 |
| 5,191,269 | 3/1993 | Carbolante | 318/254 |
| 5,200,675 | 4/1993 | Woo | 318/254 |
| 5,210,474 | 5/1993 | Oswald | 318/254 |
| 5,223,775 | 6/1993 | Mongeau | 318/432 |
| 5,245,256 | 9/1993 | Cassat et al. | 318/254 |
| 5,274,313 | 12/1993 | Amrhein | 318/629 |
| 5,285,135 | 2/1994 | Carobolante et al. | 318/254 |
| 5,319,289 | 6/1994 | Austin et al. | 318/254 |
| 5,323,093 | 6/1994 | Kikuchi | 318/254 |
| 5,334,917 | 8/1994 | Lind | 318/254 |
| 5,382,889 | 1/1995 | Peters et al. | 318/254 |
| 5,428,276 | 6/1995 | Carobolante et al. | 318/254 |
| 5,446,353 | 8/1995 | Schowe | 318/254 |
| 5,469,215 | 11/1995 | Nashiki | 318/432 |
| 5,486,743 | 1/1996 | Nagai | 318/439 |
| 5,631,787 | 5/1997 | Huang et al. | 360/97.02 |
| 5,677,605 | 10/1997 | Cambier et al. | 318/254 |

FOREIGN PATENT DOCUMENTS

| | | |
|---|---|---|
| 466-673-A | 7/1991 | European Pat. Off. . |
| 4132881-A1 | 10/1991 | Germany . |
| 55-106095 | 8/1980 | Japan . |
| 60-204285 | 10/1985 | Japan . |
| 2-206391 | 8/1990 | Japan . |
| 3-178590 | 8/1991 | Japan . |
| 93/10612 | 11/1993 | WIPO . |

*Primary Examiner*—Paul Ip
*Attorney, Agent, or Firm*—Gray Cary Ware Freidenrich

[57] ABSTRACT

An apparatus and method for reducing spindle power and acoustic noise in a self-commutating brushless d.c. motor for a disk drive adjusts the commutation angle of the motor until a point of optimum power consumption is reached. In a preferred approach implemented during disk drive operation, a direction in which to change the commutation angle is determined such that spindle power consumption is decreased. The commutation angle is the changed in the determined direction until a point of minimum spindle power consumption is identified. In order to determine the correct direction of commutation angle change, the commutation angle is varied in a first direction for so long as the spindle power consumption is decreasing. If varying the commutation angle of the motor in the first direction results in an increase in spindle power consumption, the commutation angle of the motor is varied in a second direction. During drive operation, the commutation angle may be varied back and forth in order to maintain the point of minimum spindle power consumption. The apparatus and method also minimizes torque ripple by determining a drive torque profile and storing that profile in memory as a table of torque constant values indexed to the rotational position of the disk. As the disk spins, its rotational position is sensed and the drive current is adjusted using a corresponding torque constant value. In this way, the drive current is varied inversely to the torque profile so as to produce a substantially uniform torque output, or a torque output that additionally compensates for structural resonance or other drive properties. Still further, a current offset value may be applied that is proportional to the difference between the torque profile and the average torque.

39 Claims, 5 Drawing Sheets

5,886,489

APPARATUS AND METHOD FOR REDUCING SPINDLE POWER AND ACOUSTIC NOISE IN A DISK DRIVE

BACKGROUND OF THE INVENTION

The present invention is directed generally to disk drives for data storage. More particularly, the invention concerns a motor control system for reducing spindle power and acoustic noise in such drives.

The use of multi-phase brushless d.c. motors for powering computer disk drives is well known. In such drives, a plurality of stator coil elements are configured on a stationary substrate having a central axis about which the coil elements are uniformly arranged. A rotor assembly having a plurality of permanent magnets formed thereon rotates around the central axis, above the stator coils. The coils are periodically energized in order to induce rotational movement in the rotor assembly. Unlike conventional brush motors having mechanical brushes to commutate the stator coils, brushless or commutator-free motors used in disk drives are self commutating. They rely on magnetic or optical sensors and electronic circuitry to provide output commutation signals corresponding to the angular position and rotational speed of the rotor element.

In contrast to conventional d.c. motors, brushless motors tend to generate unwanted noise and vibration as a result of excessive spindle power consumption. Moreover, whereas conventional d.c. motors have many commutator bars providing a relatively smooth torque output curve, brushless motors have relatively few phases driving the rotor. The relatively long duration of passage of the rotor over the stator results in significant torque ripple, which in turn causes acoustic noise and vibration, The structural components of the drive may also generate acoustic noise and vibration, as a result of structural resonance for example.

Accordingly, there is an evident need in the art for an improved brushless d.c. motor control system for a disk drive. What is required is an apparatus and method that efficiently reduces spindle power and accoustic noise and vibration caused by excessive power consumption, torque ripple and physical drive properties.

SUMMARY OF THE INVENTION

In accordance with the foregoing objectives, an apparatus and method for reducing spindle power and acoustic noise in a brushless d.c. motor for a disk drive adjusts the commutation angle of the motor until a point of optimum power consumption is reached. In a preferred approach implemented during drive operation, a direction in which to change the commutation angle is determined such that spindle power consumption is decreased. The commutation angle is then changed in the determined direction until a point of minimum spindle power consumption is reached. In order to determine the correct direction of commutation angle change, the commutation angle is varied in a first direction for so long as the spindle power consumption is decreasing. If varying the commutation angle of the motor in the first direction results in an increase in spindle power consumption the commutation angle of the motor is varied in a second direction. During drive operation the commutation angle may be varied back and forth in order to maintain the point of minimum spindle power consumption. In an alternative approach, an optimum commutation angle may be programmed into a disk drive during its manufacture based on power consumption and/or acoustic noise data obtained for that drive or based on a sampling of many drives.

The apparatus and method also minimizes torque ripple by determining a drive torque profile and storing that profile in memory as a table of torque constant values indexed to the rotational position of the disk. The torque profile can be determined during drive manufacture based on data obtained for that drive or based on a sampling of many drives. As the disk spins, its rotational position is sensed and the drive current is a adjusted using a corresponding torque constant value. In this way, the drive current is varied inversely to the torque profile so as to produce a substantially uniform torque output, or a torque output that additionally compensates for structural resonance or other drive properties. Still further, a current offset value may be applied that is proportional to the difference between the torque profile and the average torque.

BRIEF DESCRIPTION OF THE DRAWINGS

The objects, advantages and features of the present invention will be more clearly understood by reference to the following detailed disclosure and the accompanying drawing in which.

DETAILED DESCRIPTION OF THE PREFERRED EMBODIMENTS

Figure 1:
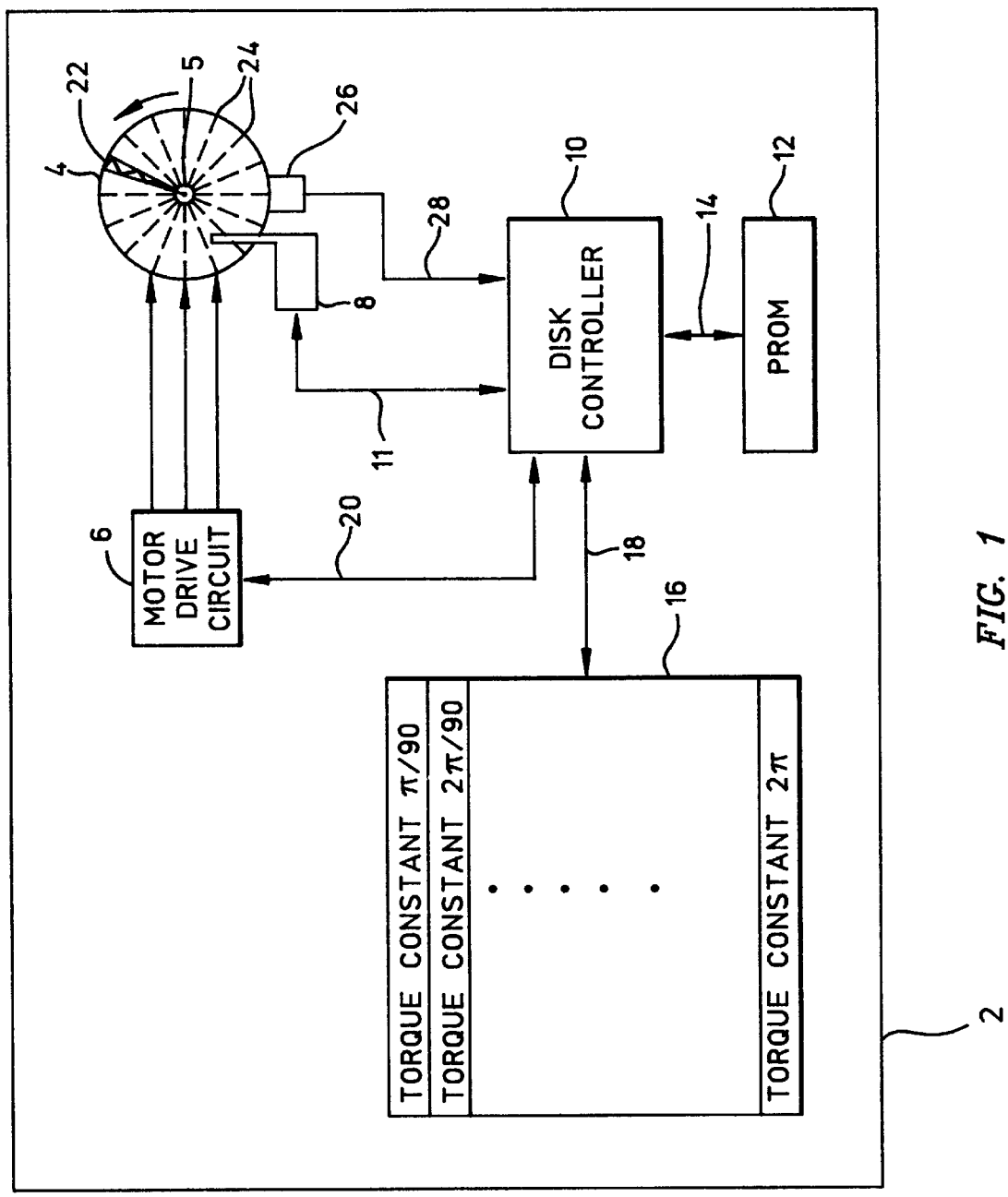
FIG. 1 is a block diagram showing the functional components of an apparatus constructed in accordance with the invention.

Referring now to FIG. 1, a disk drive 2 includes a disk assembly 4 containing one or more disk platters carried on a spindle that is powered by a drive motor 5. The disk assembly 4 may be of any conventional type used for direct access data storage and retrieval, including magnetic, optical, and magneto-optical media. As is known, the disk(s) of the disk assembly 4 are configured to store data in a plurality of concentric tracks, each of which are divided into plurality of sectors. The drive motor 5 is a polyphase, brushless d.c. motor which conventionally includes a stationary circuit element having a plurality of stator coil structures formed about a central axis thereof, and a moveable rotor assembly having a plurality of permanent magnets mounted for rotation about the central axis, above the stator coils. Other design configurations may also be used, as is known in the art.

Figure 2:
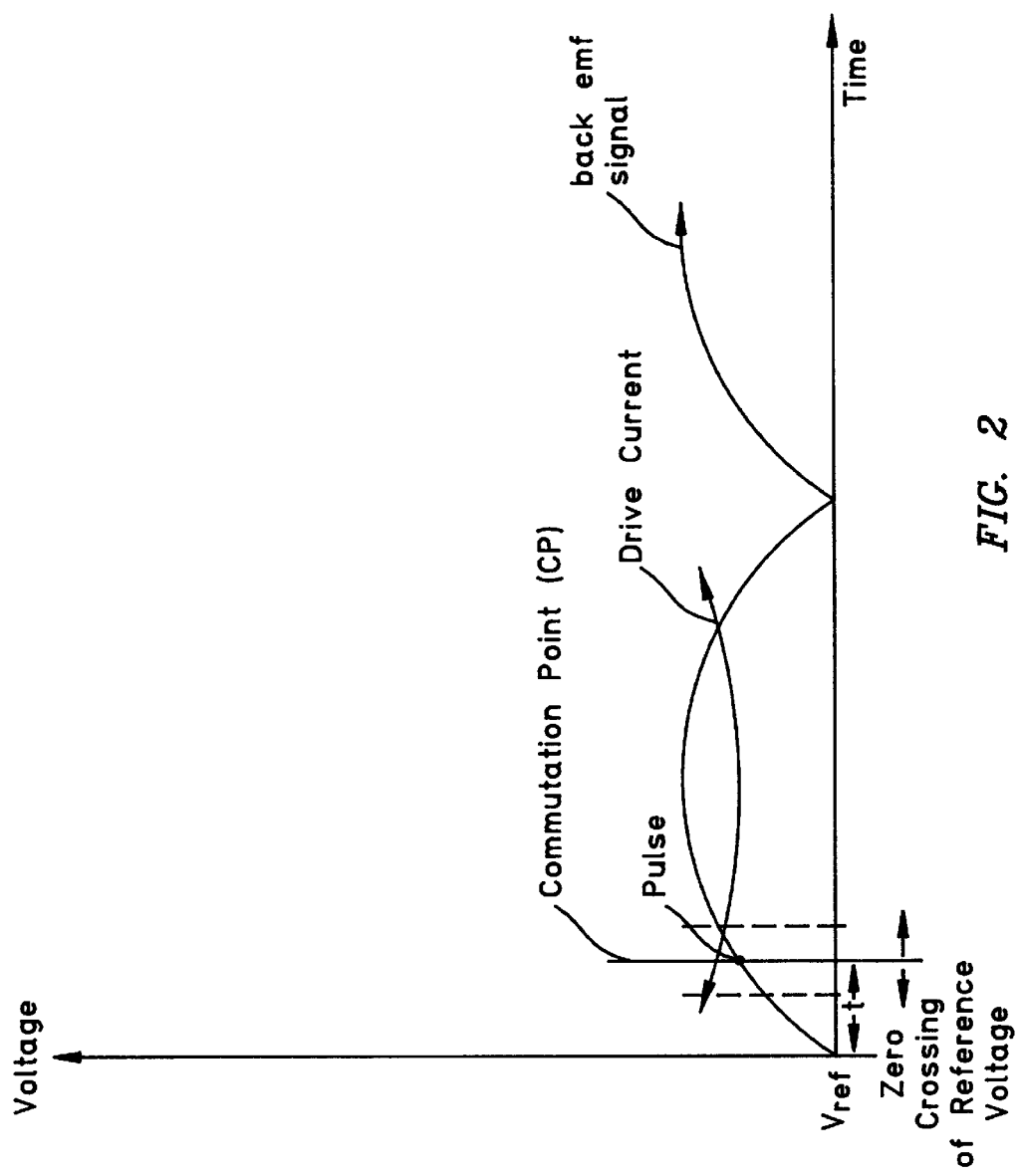
FIG. 2 is a graph showing commutation timing in the apparatus of FIG. 1.

A motor drive circuit 6 provides electrical signals to the drive motor 5 that selectively energize and deenergize (i.e., commutate) the magnetic stator coils (motor phases) in the drive motor to cause the disk assembly 4 to rotate. As is conventional, the disk controller 10 controls the timing of the stator coil energization pulses as a function of the rotational position of the rotor (i.e., the commutation angle). It does this by sensing a position indicating event and calculating a delay for the commutation pulse. The position indicating event is preferably produced by a Hall-effect sensor or some other indicator. For example, as is known, the rotor in a brushless d.c. motor having permanent magnets will produce a back emf voltage in the motor phases as the rotor rotates. The magnitude of the back emf signal from a motor winding not presently being activated can be compared to a reference voltage in order to determine when to change the activation of the motor windings (i.e., commutate) to induce rotation in the rotor. In a three phase motor, two of the phases are energized while one is not. The back emf signal is monitored on the unenergized phase to determine the back emf zero crossing point across the reference voltage. The back emf fluctuates as a sine function. The time at which the commutation pulse is sent is calculated by allowing a predetermined delay to occur after the zero crossing event. In a typical three-phase dc motor, a conventional commutation angle is thirty (30) electrical decrees from a zero crossing of the back emf of a floating (unenergized) coil of the motor. FIG. 2 illustrates the relationship between the commutation point (CP) in terms of a time delay (t) following the zero crossing point of the rectified back emf signal across a reference voltage. As is known in the art, the commutation angle (or delay) in a brushless d.c. motor can be controlled either digitally or by analog circuitry.

Returning now to FIG. 1, a head assembly 8 of conventional design is mounted adjacent the disk assembly 4 and is positionable to write and/or read data on the disks in accordance with known techniques. The head assembly 8 is electrically connected to a disk controller 10 via a data/control line 11, with appropriate signal processing (not shown) being provided as necessary. The disk controller 10 is a digital processor made from conventional hardware components. Its operation is controlled by firmware resident in a Programmable Read Only Memory (PROM) array 12 which may be electrically (EEPROM) or otherwise (EPROM) erasable. The PROM 12 communicates with the disk controller 10 via a bus line 14. The disk drive 2 further includes a random access memory (RAM) 16 communicating with the disk controller via a bus line 18.

The disk controller 10 sends control information to, and receives operating information from, the motor drive circuit 6 via a control line 20, with appropriate analog/digital conversion (not shown) being provided as necessary if the motor drive circuit is analog in nature. Specifically as described in detail below, the motor drive circuit 6 provides commutation angle position data and drive current information to the disk controller 10. In response the disk controller provides commutation angle control signals and drive current correction signals for varying the commutation angle and drive current of the drive motor 5, respectively.

The disk controller 10 also needs to receive information about the rotational position of the disk assembly 4. In a preferred embodiment, it does so using the head assembly 8 via the line 11. An initial disk rotational position call be established by placing a plurality of baseline index markets 22 along a single radius extending across all of the tracks of the disk(s) of the disk assembly 4. Each revolution of the disk(s) is easily sensed by the head assembly 8, no matter which track the head assembly is positioned over, by reading the baseline index markers. To further monitor disk rotational position between each revolution, the disk(s) of the disk assembly 4 is provided with a series of timing marks 24 extending along multiple radii (e.g. ninety (90) radii) across all of the tracks of the disks. With ninety (90) timing marks per track, the rotational position of the disk assembly 4 between each revolution is closely monitored by the disk controller 10. It will be understood, however, that the number of timing marks used may vary depending upon factors such as desired data capacity and position accuracy.

As an alternative to using the head assembly 8 for determining disk rotational position between revolutions a sensor 26 which may be part of the motor drive circuit 6 or separate therefrom, is employed to sense the back emf signals from nonenergized motor phases and to provide that information to the disk controller 10 via a control line 28. As a still further alternative, the disk rotational position between revolutions is determined using a free-running clock. By calculating the number of clock ticks per revolution of the disk assembly 4 to establish a rotational speed, disk rotational position between revolutions is determined by counting, the number of clock ticks following the time at which the index marker 22, or a back emf pulse, is sensed.

Using the foregoing system configuration, and in accordance with a first aspect of the invention, the disk controller 10 is programmed to control the motor drive circuit 6 to adjust the commutation angle in order to achieve the optimal the current required to drive the spindle in a manner that minimizes spindle power consumption. This change in commutation angle is illustrated graphically in FIG. 2 by the dashed lines showing a range of angular positions over which the commutation point CP might be varied relative to the zero crossing point of the back emf signal.

Figure 3:
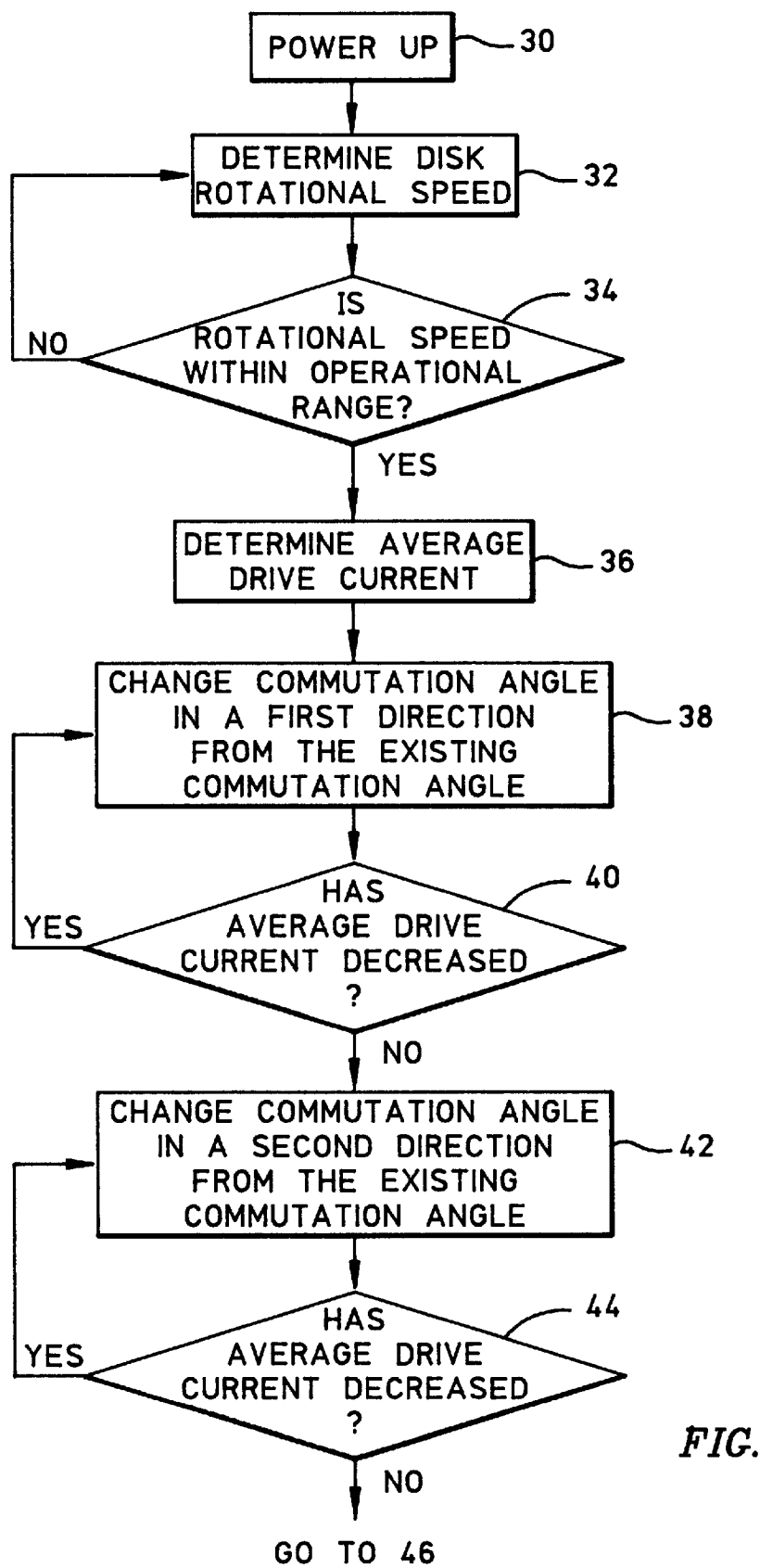
FIG. 3 is a flow diagram showing method steps performed by the apparatus of FIG. 1.
Figure 3A:
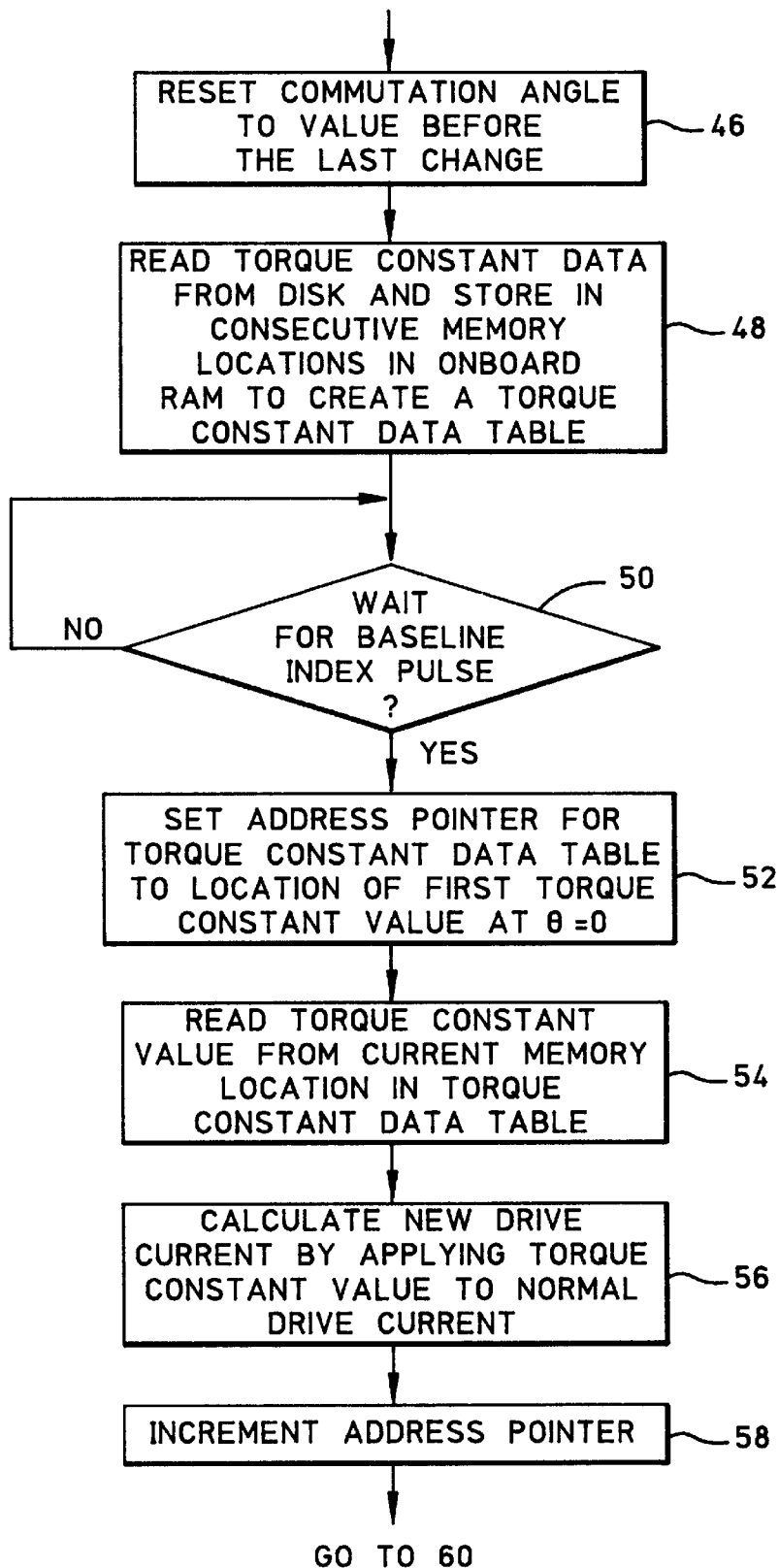
Figure 3B:
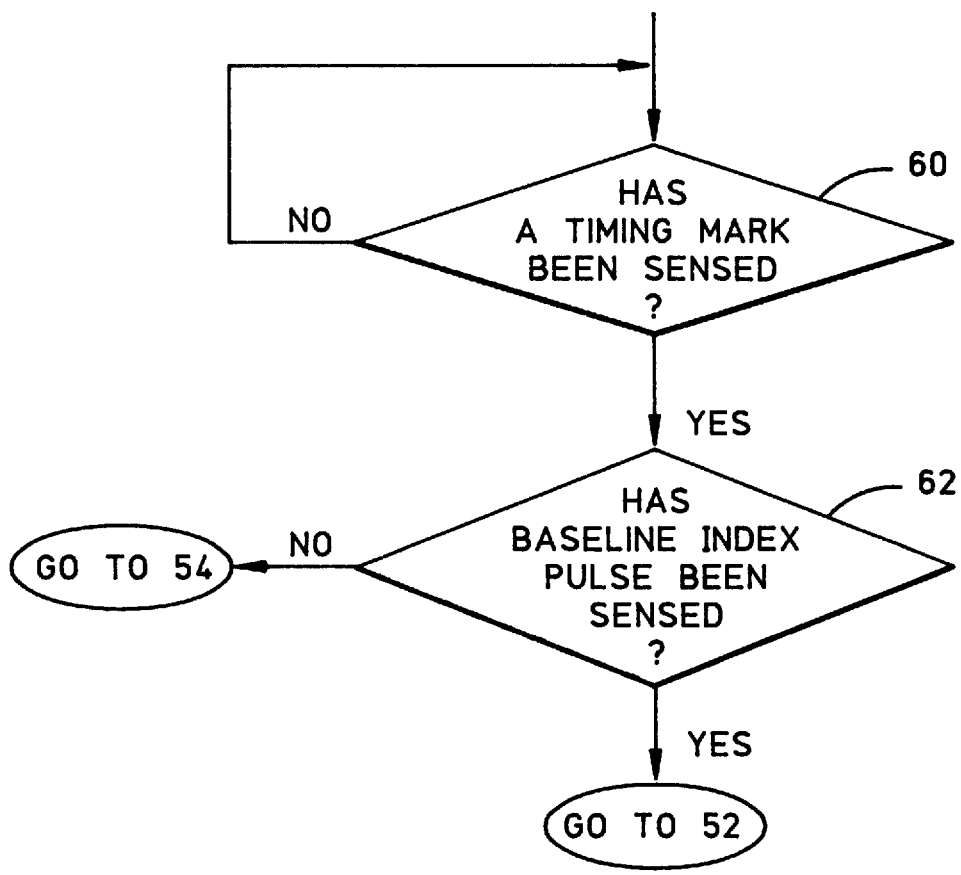

Referring now to FIG. 3, the disk drive of FIG. 1 is preferably operated in accordance with the first aspect of tile invention in a manner now to be described in which the disk controller 10 performs a series of method steps under the control of a program resident in the PROM 12. The program is written as source code in any conventional programming language, such as "C," and compiled to a produce a binary machine language instruction set. Alternatively the program is assembled from source code written in assembly language.

In a first Step 30 of the method, the disk drive 2 is powered up and the disk assembly 4 begins to accelerate to a nominal, substantially constant operating speed. In Steps 32 and 34, the disk controller 10 begins to periodically check the rotational speed of the disk assembly 4 to determine if the disk assembly has reached its nominal operating range. When it has, the disk controller begins in Step 36 to sample real time drive current information provided by the motor drive circuit 6 via line 20, and to process that information to determine an average drive current required to power the drive motor 5 according to known methods. Alternatively, Step 36 is performed by the motor drive circuit 6, which includes digital circuitry, or in an analog design, a capacitor circuit for calculating, average drive current. The motor drive circuit 6 then provides that information directly to the disk controller 10.

In Steps 38 through 48, the disk controller determines a commutation angle that will minimize spindle power consumption. It does this by sensing the spindle power consumption of the drive motor 5 as a function of commutation angle, and by adjusting the commutation angle of the motor until a point of minimum spindle power consumption is reached. More specifically, the disk controller 10 in conjunction with the motor drive circuit 6, performs the following steps: (a) Sensing spindle power consumption as a function of the commutation angle of the motor 5, (b) determining a direction in which to change the commutation angle such that spindle power consumption is decreased, and (c) changing the commutation angle in the direction determined in step (b) until a point of minimum spindle power consumption is reached. Thereafter, the disk controller periodically adjusts the commutation angle as necessary to maintain a point of minimum spindle power consumption throughout drive operation. The disk controller periodically adjusts the commutation angle to maintain a point of minimum spindle power consumption during drive operation by repeating steps (a), (b) and (c).

In accordance with FIG. 3. steps (a), (b) and (c), are preferably implemented as follows: In Step 38, the disk controller 10 requests the motor drive circuit 6 to incrementally vary the commutation angle of the disk drive motor 5 in a first direction from the existing commutation angle. The incremental variation in commutation angle is preferably in a range of approximately 0.5 to 1.0 electrical degrees, although other increments could he used. The total amount of required commutation angle variation may be as much as ±10 to 25 electrical degrees. In Step 40, the disk controller 10 tests the real time drive current data provided by the motor drive circuit 6 across line 20 to determine whether spindle power consumption of the drive motor 5 has decreased as a result of varying the commutation angle in the first direction. If spindle power consumption has decreased, Steps 38 and 40 are repeated until a point of minimum spindle power consumption is reached. If it is determined in Step 40 that spindle power consumption has increased as a result of varying the commutation angle in the first direction, Step 42 is invoked to vary the commutation angle of the drive motor 5 in a second opposing direction. In Step 44, the disk controller 10 again tests the real time drive current provided by the motor drive circuit 6 across line 20 to determine whether spindle power consumption of the drive motor 5 has decreased as a result of varying the commutation angle in the second direction. If spindle power consumption has decreased, Steps 42 and 44 are repeated until a point of minimum spindle power consumption is reached.

In order to determine the commutation angle at which minimum spindle power consumption is reached a method is needed to avoid "overshooting the mark." This condition arises from the fact that the method cannot determine whether a point of minimum spindle power consumption has been reached until it makes one adjustment beyond the minimum power point. For example, after one or more commutation angle adjustments in a given direction, a point of minimum spindle consumption will be reached. That point will be followed by another commutation angle adjustment and a determination that spindle power consumption has increased from the previous value. To return to the point of minimum spindle power, the commutation angle must be reset to its previous value. Thus, the method includes Step 46, which is invoked after varying the commutation angle until the spindle power consumption no longer decreases (i.e., it is greater), to reset the commutation angle to the value before the last change in commutation angle.

Once the commutation angle required for minimum spindle power consumption has been determined following power up, the same procedure can be periodically invoked during drive operation to maintain the point of minimum spindle power consumption.

As an alternative to the foregoing implementation of the first aspect of the invention, an optimum commutation angle is programmed into the disk drive 2 during its manufacture based on data obtained for that drive or based on a sampling of many drives. The optimum commutation angle is determined, as in the foregoing discussion of FIG. 3, as a function of the minimum achievable spindle power consumption. Alternatively, the optimum commutation angle is determined by directly measuring acoustic performance in manufacturing each drive, or by sampling the acoustic performance of many drives. The optimum commutation angle is stored on the disk assembly 4 or in the PROM 12, for example.

In accordance with a second aspect of the invention, the drive current applied to the motor 5 is adjusted to compensate for torque ripple and/or acoustic noise resulting from structure resonance and/or other drive properties. The amount of drive current adjustment to apply is determined by making measurements of many files based on preexisting drives or, as part of the manufacturing process, by measuring a torque profile for each individual drive. In either case, a series of torque constant values is determined relative to the rotational position of the rotor. The number of torque constant values preferably corresponds to the number of timing marks 24 on the disk(s) of the disk assembly 4 (e.g., 90). Each torque constant is a dimensionless value representing a multiple by which the actual measured torque differs from a nominal constant torque value. The variation in drive current determined from the torque constant information is utilized both during and in between successive commutations of the drive motors. FIG. 2 illustrates how the drive current might vary relative 10 commutation.

The torque constant information is stored in the PROM 12 or on the disk assembly 4. In the former case, the torque constant information is accessed by the disk controller 10 directly from the PROM 12. The latter case represents the preferred embodiment, as shown in step 48 of FIG. 3. The torque constant information is read from the disk assembly 4 and placed in the RAM 16 as part of the power up process, or thereafter. The torque constant information is preferably stored in table form as a torque constant table that is indexed by successive addresses in the RAM 16, each of which holds a single torque constant value corresponding to a rotational position increment of the disk assembly. Other formats, such as a polynomial fit may alternatively be used. According to this alternative, the disk controller 10 is programmed to solve a polynomial equation to determine a torque constant value based on an input value representing the rotational position of tile disk assembly 4.

Turning back to FIG. 3, the disk controller 10 waits in Step 50 for a baseline index pulse to he sensed by the head assembly 8 reading the baseline index marker 22 on the disk assembly 4. When the baseline index pulse is received, the disk controller 10 initializes the address pointer for the RAM 16 to the memory location of the first torque constant value corresponding to an angle of zero degrees. In Step 54, the disk controller 10 reads the torque constant value from the current location in the torque constant table. The disk controller 10 then calculates a new drive current in Step 56 by modifying the actual real time current then being reported by the motor drive circuit 6 via line 20 using the inverse of the retrieved torque constant. The corrected drive current value is returned to the motor drive circuit 6 via line 20 and applied to the drive motor 5. In step 58, the address pointer for the RAM 16 is then incremented to the next position in the torque constant table and the disk controller 10 waits for a timing mark 24 to be sensed in Step 60. When a timing mark is sensed, the disk controller determines in Step 62 whether a new baseline index pulse has been sensed. If not, the disk controller 10 returns to Step 54 to read out the next torque constant value. When the next baseline index pulse is sensed in Step 62, the disk controller 10 returns to Step 52 to reinitialize the address pointer to begin a new rotation.

The corrected drive current determined according to the above method would typically be inversely proportional to the torque profile of the disk drive 2. However, in some cases it may be desirable to produce a corrected drive current that varies inversely with the torque profile but not necessarily proportionally thereto. For example, if the disk drive generates acoustic noise due to structural resonance or some other physical drive characteristic, the invention could be adapted to apply a corrected drive current that does not result in a uniform torque output but instead produces a torque output that varies in a way that will cancel the noise generating vibrations. In that case, additional current modifying values may be combined with the torque constant values, either in stored form or using real time calculations, to produce an output torque of any desired waveform. It may also be desirable to combine the torque constant values determined from the measured torque profile with a constant offset value that is proportional to the difference between the torque profile and the average torque (i.e., the rms of the torque ripple waveform).

Accordingly, an apparatus and method for reducing spindle power and accoustic noise in a disk drive has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. A method for commutating a brushless d.c. motor for a disk drive having a rotatable storage disk, wherein the motor includes a rotatable stator having a position expressed in terms of a commutation angle having a magnitude and direction, comprising the steps of:

(a) sensing spindle power consumption of the motor; and
   (b) changing the commutation angle of said motor in a direction while monitoring motor power consumption until an optimum commutation angle is determined, said optimum commutation angle being the commutation angle that yields minimum power consumption.

2. The method of claim 1 wherein said optimum commutation angle is determined in accordance with said method during manufacture of said disk drive and programmed into said drive.

3. The method of claim 1 further including the step of periodically adjusting said commutation angle following step (b) to maintain a point of minimum power consumption during drive operation.

4. The method of claim 3 further comprising the step of periodically adjusting said commutation angle to a point of minimum power consumption during drive operation by repeating steps (a), and (b).

5. The method of claim 1 further comprising the step of determining a direction in which to change said commutation angle such that the motor power consumption is decreased.

6. The method of claim 5 wherein the direction determining step further comprises the steps of:

(i) varying the commutation angle of said motor in a first direction;
   (ii) determining whether power consumption of said motor has decreased as a result of varying the commutation angle in said first direction;
   (iii) repeating steps (i) and (ii) if spindle power consumption is determined to decrease in step (ii) until a point of minimum power consumption is determined; or
   if spindle power is determined not to decrease in step (ii):
   (iv) varying the commutation angle in a second direction;
   (v) determining whether power consumption of said motor has decreased as a result of varying the commutation angle in said second direction; and
   (vi) repeating steps (iv) and (v) if power consumption is determined to decrease in step (v) until a point of minimum spindle power consumption is determined.

7. The method of claim 6 wherein steps (iii) and (vi) include the steps of varying said commutation angle until said spindle power consumption no longer decreases, then resetting said commutation angle to the value before the last change in commutation angle effected by steps (i) and (iv).

8. The method of claim 1 wherein said motor has a torque output that varies according to a predetermined torque profile when said motor is powered by a constant drive current, and wherein said method further includes the step of:

varying the real time drive current applied to said motor during and between commutations thereof inversely to said torque profile.

9. The method of claim 8 wherein said real time drive current is varied inversely proportional to said torque profile.

10. The method of claim 9 wherein a value is applied to said real time drive current that is proportional to a difference between said torque profile and an average torque.

11. The method of claim 9 wherein the rotational position of said information storage disk is determined by reading index and timing marks on said disk.

12. The method of claim 9 wherein said torque constant table is stored on said information storage disk and read into a random access memory when said disk drive is powered up.

13. The method of claim 8 wherein said drive current is varied by reading torque constant values from a torque constant table based on the rotational position of said information storage disk and applying those values to said real time drive current at selected rotational positions of said disk.

14. In a disk drive, an apparatus for reducing motor power and/or accoustic noise in a self-commutating brushless d.c. motor for said disk drive wherein the motor includes a rotatable stator having a position expressed in terms of a commutation angle having a magnitude and direction, said apparatus comprising:

sensing means for sensing motor power consumption; and
   commutation angle adjustment means for varying the commutation angle in a desired direction until a point of minimum power consumption is sensed.

15. The apparatus of claim 14 further including power maintenance means for periodically adjusting said commutation angle to a point of minimum power consumption during drive operation.

16. The apparatus of claim 15 wherein said power maintenance means employs said sensing means and said angle adjustment means to periodically adjust said commutation angle to maintain said point of minimum power consumption during drive operation.

17. The apparatus of claim 14 further comprising means for determining a direction in which to chance said commutation angle such that the motor power consumption is decreased.

18. The apparatus of claim 17 wherein said direction determining means includes:

test means for varying the commutation angle of said disk drive motor in a selected direction;
   power consumption determining means for determining whether power consumption of said disk drive has decreased as a result of varying the commutation angle in said selected direction; and
   iteration means for repeatedly invoking said test means to adjust said commutation angle in a first direction for so long as said power consumption determining means determines that power consumption is decreasing as a result of adjusting said commutation angle in said first direction and for repeatedly invoking said commutation angle adjustment test means to adjust said commutation angle in a second direction for so long as said power consumption determining means determines that power consumption is decreasing as a result of adjusting said commutation angle in said second direction.

19. The apparatus of claim 18 wherein said iteration means includes means for invoking said test means to vary said commutation angle until said power consumption no longer decreases, then to reset said commutation angle to the value before the last change in commutation angle effected by said commutation angle adjustment test means.

20. The apparatus of claim 14 wherein said motor has a torque output that varies according to a torque profile when said motor is powered by a constant drive current, and wherein said apparatus further includes:

current varying means for varying the real time drive current applied to said motor during and between commutations thereof inversely to said torque profile.

21. The apparatus of claim 20 wherein said current varying means varies said real time drive current inversely proportional to said torque profile.

22. The apparatus of claim 21 wherein said current varying means further varies said real time drive current by applying a value thereto that is proportional to a difference between said torque profile and an average torque.

23. The apparatus of claim 20 wherein said means for varying said drive current includes means for reading torque constant values from a torque constant table based on the rotational position of said information storage disk and applying those values to said real time drive current at selected rotational positions of said disk.

24. The apparatus of claim 23 wherein said torque constant table is stored on said storage disk and read into a random access memory when said disk drive is powered up.

25. The apparatus of claim 23 wherein the rotational position of said storage disk is determined by reading index and timing marks contained on said disk.

26. A method for operating a self-commutating brushless d.c. motor for a disk drive, comprising the steps of:

sensing an operating characteristic of said motor; and adjusting the commutation angle of said motor in a direction until an optimum commutation angle is determined that minimizes the magnitude of the operating characteristic.

27. The method of claim 26 wherein said method is performed on said disk drive during drive manufacture and said optimum commutation angle is programmed into said disk drive.

28. The method of claim 26 wherein said method is performed on a plurality of disk drives and an average optimum commutation angle is determined therefrom and programmed into said drives.

29. The method of claim 26 wherein the operating characteristic is either power or acoustic noise.

30. A method for reducing acoustic noise in a self-commutating brushless d.c. motor for a disk drive, comprising the steps of:

sensing the acoustic noise generated by said drive; and adjusting the commutation angle of said motor in a direction until an optimum commutation angle is determined that yields a point of minimum acoustic noise.

31. The method of claim 30 wherein said method is performed on said disk drive during drive manufacture and said optimum commutation angle is programmed into said disk drive.

32. The method of claim 30 wherein said method is performed on a plurality of disk drives and an average optimum commutation angle is determined therefrom and programmed into said drives.

33. A method for reducing spindle power in a self-commutating brushless d.c. motor for a disk drive, comprising the steps of:

sensing the power consumed by said motor; and adjusting the commutation angle of said motor in a direction until an optimum commutation angle is determined that yields a point of minimum power consumption.

34. The method of claim 33 wherein said method is performed on said disk drive during drive manufacture and said optimum commutation angle is programmed into said disk drive.

35. The method of claim 33 wherein said method is performed on a plurality of disk drives and an average optimum commutation angle is determined therefrom and programmed into said drives.

36. A disk drive powered by a motor having a stator whose position is determined by a commutation angle, said disk drive comprising:

means for sensing an operating characteristic of said motor; and means for adjusting the commutation angle of said motor in a direction until an optimum commutation angle is determined that minimizes the magnitude of the operating characteristics.

37. The disk drive of claim 36, wherein the operating characteristic is either power or acoustic noise.

38. A disk drive powered by a motor having a stator whose position is determined by a commutation angle, said disk driving comprising:

means for sensing the accoustic noise of said motor; and means for adjusting the commutation angle of said motor in a direction until an optimum commutation angle is determined that yields a point of minimum accoustic noise.

39. A disk drive powered by a motor having a stator whose position is determined by a commutation angle, said disk drive comprising:

means for sensing the power of said motor; and means for adjusting the commutation angle of said motor in a direction until an optimum commutation angle is determined that yields a point of minimum power consumption.

* * * * *